W. V. TURNER.
FLUID PRESSURE BRAKE DEVICE.
APPLICATION FILED DEC. 22, 1915.
1,230,952.
Patented June 26, 1917.
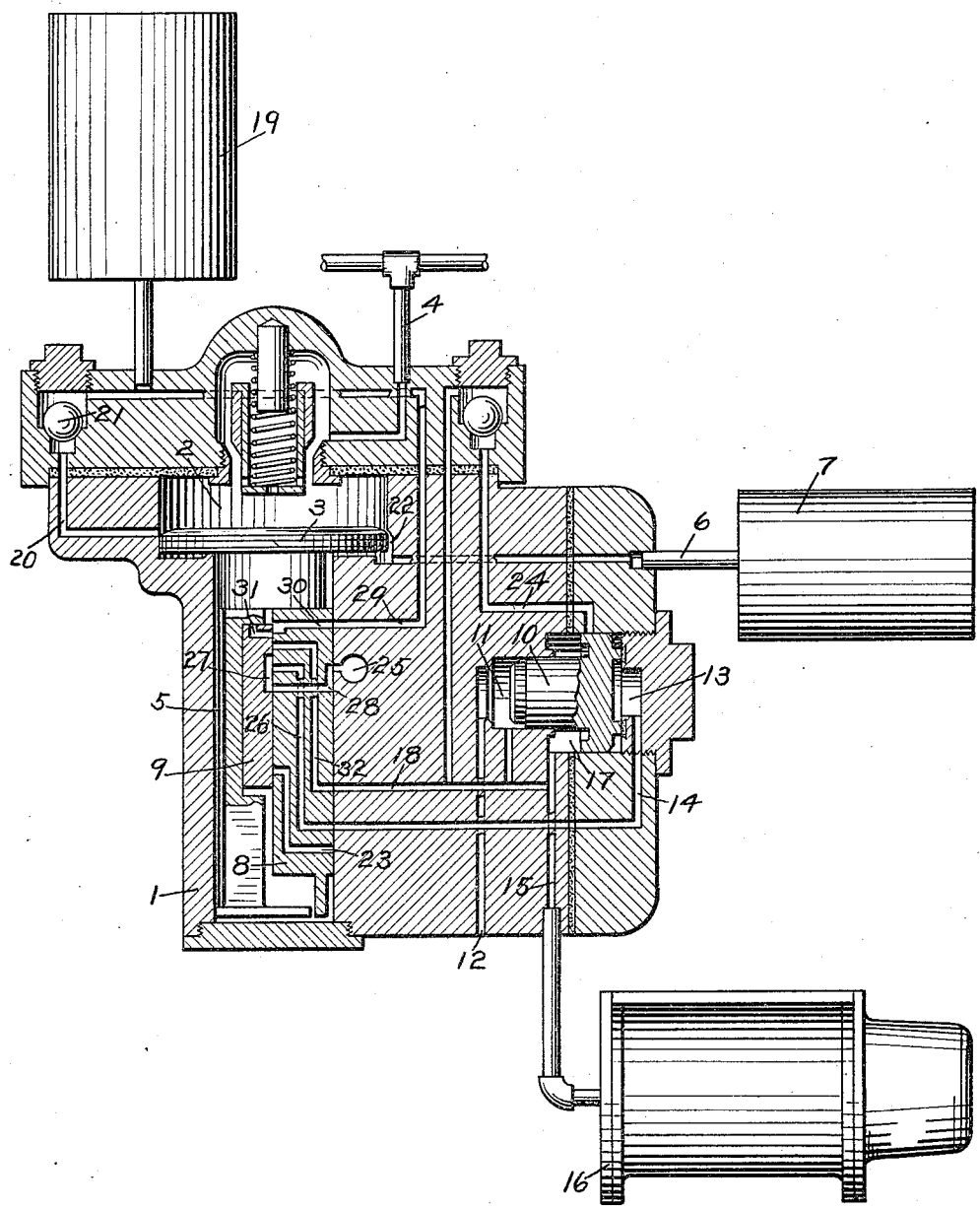
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE DEVICE.

1,230,952.  Specification of Letters Patent.  Patented June 26, 1917.

Application filed December 22, 1915. Serial No. 68,181.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brake Devices, of which the following is a specification.

This invention relates to fluid pressure brakes, and more particularly to a valve device for controlling the admission and release of fluid to and from the brake cylinder.

It has heretofore been proposed to provide a fluid pressure brake controlling a valve device in which the brakes may be graduated off upon a gradual increase in brake pipe pressure by venting fluid from a supplemental reservoir to the auxiliary reservoir side of the equalizing piston when the same moves to release position. If communication for venting fluid from the supplemental reservoir to the auxiliary reservoir is opened before communication is opened for releasing fluid from the brake cylinder it may sometimes occur where the static friction of the equalizing piston and graduating valve is but slightly greater than the moving or kinetic friction, that the equalizing valve parts may move slowly from graduated release lap position toward release position and the supplemental reservoir may then restore the auxiliary reservoir pressure to a point substantially equal to the brake pipe pressure before the graduating valve opens communication for venting fluid from the brake cylinder. The equalizing piston may then be halted and there would be a failure to release the brakes until the brake pipe pressure has been built up to a degree higher than the equalizing pressure between the supplemental and the auxiliary reservoirs and thus the graduated release function might be destroyed.

The principal object of my invention is to provide means for obviating the above possibility.

In the accompanying drawing, the single figure is a central sectional view of a brake controlling valve device embodying my improvement.

As shown, the valve device may comprise a casing 1 having a piston chamber 2 containing an equalizing piston 3 and connected to brake pipe 4 and having a valve chamber 5 connected by pipe 6 to an auxiliary reservoir 7 and containing a main slide valve 8 and a graduating slide valve 9 adapted to be operated by the piston 3.

For controlling the release of fluid from the brake cylinder a release piston device 10 may be employed having differential piston heads, the chamber 11 at the smaller head being connected to an atmospheric exhaust passage 12 and the chamber 13 at the larger head being connected to a passage 14, leading to the seat of slide valve 8. A passage 15, leading to brake cylinder 16, communicates with a chamber 17 intermediate the differential piston heads and has a branch passage 18 leading to the seat of the main slide valve.

A supplemental reservoir 19 is charged from the brake pipe through a passage 20 containing a non-return check valve 21 and said passage also leads to the seat of slide valve 8.

In operation, when the brake pipe is charged with fluid under pressure, air flows through the usual feed groove 22 around the piston 3, charging valve chamber 5 and auxiliary reservoir 7. Fluid also flows through passage 20 and charges the supplemental reservoir 19.

An application of the brakes may be effected by reducing the brake pipe pressure in the usual manner, so that the equalizing piston 3 moves the slide valves 8 and 9 to bring the service port 23 into registry with passage 14. Fluid then flows from the auxiliary reservoir through passage 14 to piston chamber 13, shifting the release piston device 10 so as to uncover a passage 24 through which fluid can flow to the brake cylinder 16, at the same time closing the brake cylinder exhaust passage 12.

If it is desired to effect a graduated release of the brakes, the brake pipe pressure is gradually increased and the equalizing piston 3 shifted to release position.

In the release position, as shown in Fig. 1, passage 14 is connected to exhaust port 25 through port 26 in the main slide valve 8, cavity 27 in the graduating valve 9, and port 28, so that fluid is vented from chamber 13 and the brake cylinder pressure acting in chamber 17 then operates the differential piston 10 to open the brake cylinder exhaust port 12.

Fluid from the supplemental reservoir 19 flows through passage 29 and port 30 to the valve chamber 5, but it will be noted that communication is restricted by the graduating valve 9. The increase in auxiliary reservoir pressure by flow of fluid from the supplemental reservoir operates to shift the piston 3 and thus by reason of the lost motion of the piston, an end wall of the piston stem uncovers a port opening of an additional supplemental reservoir port 31 which also registers with port 30, so that an increased flow of fluid from the supplemental reservoir to the auxiliary reservoir is secured, although the restricted opening of the port 30 is now closed, which insures the further movement of the piston and the graduating slide valve to graduated release lap position. In this position the graduating valve connects ports 26 and 32 through cavity 27, so that the pressures in chambers 17 and 13 are allowed to equalize, and since the pressure in the chamber 11 is much lower, the differential piston will be shifted to close the brake cylinder exhaust.

If it is desired to further reduce the brake cylinder pressure, another gradual increase in brake pipe pressure is effected and this causes the movement of the equalizing piston 3 toward release position. The initial movement of the piston closes the port 31 in the graduating valve by contact of the end wall of the piston stem with said port and the graduating valve is then moved. The location of ports is such that cavity 27 will partly register with ports 26 and 28 before the supplemental reservoir port 30 is opened, so that the operation of the release piston is insured as well as further movement of the parts to full release position, since the flow of fluid from the supplemental reservoir, even when this port opens, is so restricted as to eliminate the possibility of the auxiliary reservoir pressure building up at a rate sufficient to interfere with the movement to release position.

The building up of auxiliary reservoir pressure through the port 30 is necessarily slow and the object of providing the additional port 31 is to permit a more rapid flow from the supplemental reservoir when the piston moves toward graduated release lap position, so that the prompt movement of the graduating valve and piston may be secured. The piston 3 has a movement relative to the graduating valve 9, so that the port 31 is opened by the movement of the piston before the graduating valve is moved.

Having now described my invention, what I claim as new and desire to secure by Letters Patent, is:

1. In a fluid pressure brake, the combination with a brake cylinder and a valve device having ports for effecting the release of fluid from the brake cylinder, of a supplemental reservoir from which fluid is supplied through a port controlled by said valve device for shifting same from release position, the release ports being arranged to open in advance of the supplemental reservoir port in the movement toward release position.

2. In a fluid pressure brake, the combination with a brake cylinder, auxiliary reservoir, brake pipe, and a supplemental reservoir, of a piston subject to the opposing pressures of the auxiliary reservoir and brake pipe and valves operated by said piston for controlling the release of fluid from the brake cylinder and the admission of fluid from the supplemental reservoir to the auxiliary reservoir, communication being opened for effecting the release of fluid from the brake cylinder during movement toward release position before communication is opened for supplying fluid from the supplemental reservoir to the auxiliary reservoir.

3. In a fluid pressure brake, the combination with a brake cylinder, auxiliary reservoir, brake pipe, and a supplemental reservoir, of a piston subject to the opposing pressures of the auxiliary reservoir and brake pipe, a main valve, and a graduating valve having a movement relative to the main valve for controlling ports adapted to effect the release of fluid from the brake cylinder and the supply of fluid from the supplemental reservoir to the auxiliary reservoir, said ports being arranged to open the brake cylinder release controlling ports before the supplemental reservoir supply port is opened upon movement of the graduating valve toward release position.

4. In a fluid pressure brake, the combination with a brake cylinder, auxiliary reservoir, brake pipe, and a supplemental reservoir, of a piston subject to the opposing pressures of the auxiliary reservoir and brake pipe, a main valve, and a graduating valve having a movement relative to the main valve for controlling ports adapted to effect the release of fluid from the brake cylinder and a restricted port through which fluid is supplied from the supplemental reservoir to the auxiliary reservoir, the release ports being opened in advance of the restricted port upon movement of the graduating valve toward release position.

5. In a fluid pressure brake, the combination with a brake cylinder, auxiliary reservoir, brake pipe, and a supplemental reservoir, of a valve device for effecting the release of fluid from the brake cylinder and controlling a restricted port for supplying fluid from the supplemental reservoir to the auxiliary reservoir in the movement toward release position and an additional port for supplying fluid from the supplemental reservoir to the auxiliary reservoir upon movement from release position.

6. In a fluid pressure brake, the combination with a brake cylinder, auxiliary reservoir, brake pipe, and a supplemental reservoir, of a piston subject to the opposing pressures of the auxiliary reservoir and brake pipe, a main valve, and a graduating valve operated by said piston and adapted upon movement toward release position to open a restricted port for supplying fluid from the supplemental reservoir to the auxiliary reservoir and to open an additional port for supplying fluid from the supplemental reservoir to the auxiliary reservoir upon movement from release position.

7. In a fluid pressure brake, the combination with a brake cylinder, auxiliary reservoir, brake pipe, and a supplemental reservoir, of a piston subject to the opposing pressures of the auxiliary reservoir and brake pipe, a main valve, and a graduating valve operated by and having a movement relative to said piston for opening a restricted port for supplying fluid from the supplemental reservoir to the auxiliary reservoir during movement toward release position, relative movement of said piston with respect to the graduating valve from release position being adapted to open an additional port controlled by the graduating valve for also supplying fluid from the supplemental reservoir to the auxiliary reservoir.

8. In a fluid pressure brake, the combination with a brake cylinder, auxiliary reservoir, brake pipe, and a supplemental reservor, of a piston subject to the opposing pressures of the auxiliary reservoir and brake pipe, a main valve, and a graduating valve operated by and having a movement relative to the piston for controlling ports adapted to effect the release of fluid from the brake cylinder, said graduating valve operating upon movement toward release position to first open said release ports and then a restricted port for supplying fluid from the supplemental reservoir to the auxiliary reservoir, an additional port in the graduating valve being opened by the relative movement of the piston with respect to the graduating valve from release position for also supplying fluid from the supplemental reservoir to the auxiliary reservoir.

9. In a fluid pressure brake, the combination with a brake cylinder, auxiliary reservoir, brake pipe, and a supplemental reservoir, of a release piston for controlling the release of fluid from the brake cylinder, an equalizing piston subject to the opposing pressures of the auxiliary reservoir and brake pipe, and valves operated by said piston upon movement toward release position for first opening ports for controlling the release piston and then a port for supplying fluid from the supplemental reservoir to the auxiliary reservoir.

10. In a fluid pressure brake, the combination with a brake cylinder, auxiliary reservoir, brake pipe, and a supplemental reservoir, of a release piston for controlling the release of fluid from the brake cylinder, an equalizing piston subject to the opposing pressures of the auxiliary reservoir and brake pipe, a main valve, and a graduating valve operated by and having a movement relative to said piston and adapted upon movement toward release position for first opening ports for controlling said release piston and then a restricted port for supplying fluid from the supplemental reservoir to the auxiliary reservoir, the relative movement of said piston with respect to the graduating valve from release position being adapted to open an additional port controlled by the graduating valve for supplying fluid from the supplemental reservoir to the auxiliary reservoir.

In testimony whereof I have hereunto set my hand.

WALTER V. TURNER.

Copies of this patent may be obtained for five cents each, by addressing the "Commissioner of Patents, Washington, D. C."